Jan. 9, 1940.  E. H. GROH  2,186,583
FABRIC CUTTING MACHINE
Filed July 21, 1938  3 Sheets-Sheet 1
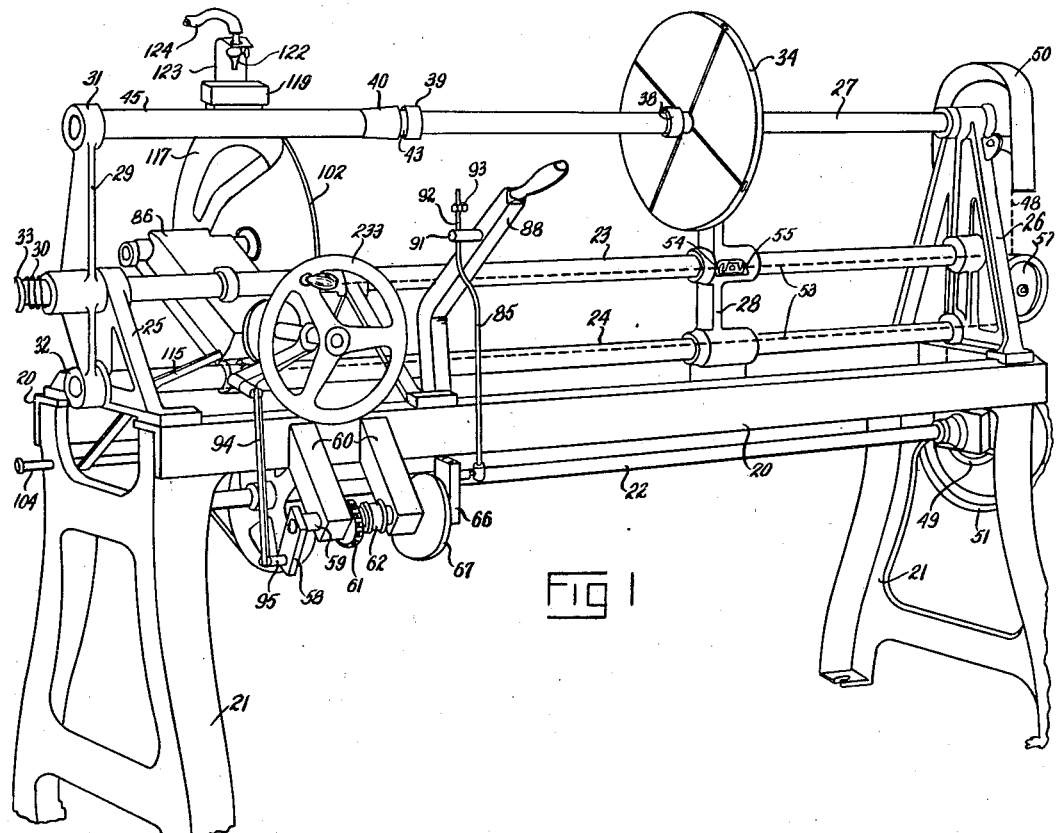
Fig 1
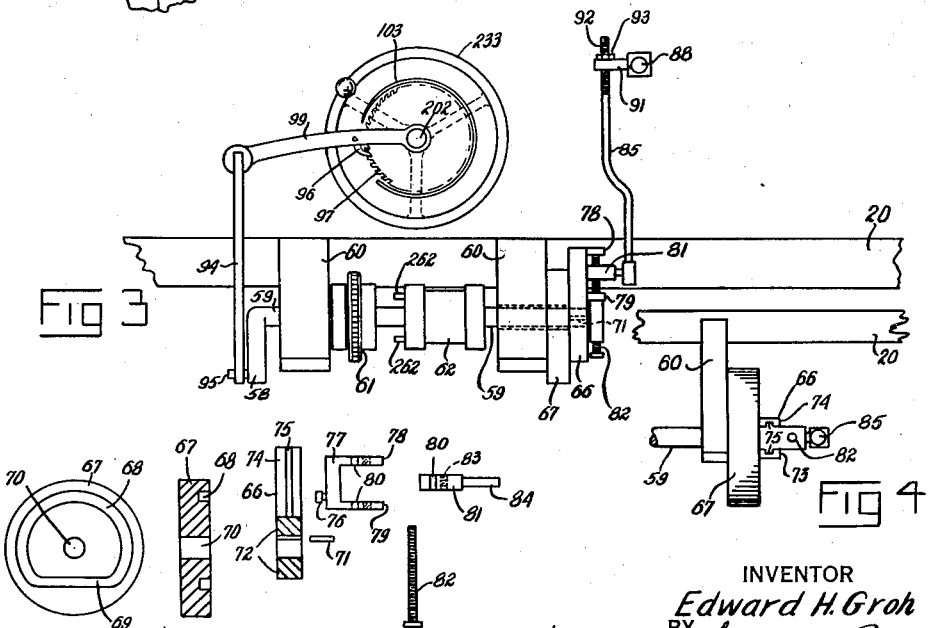
Fig 3
Fig 4
Fig 5
Fig 6
INVENTOR
Edward H. Groh
BY Frank Zugelter
ATTORNEY Jan. 9, 1940.  E. H. GROH  2,186,583
FABRIC CUTTING MACHINE
Filed July 21, 1938  3 Sheets-Sheet 2
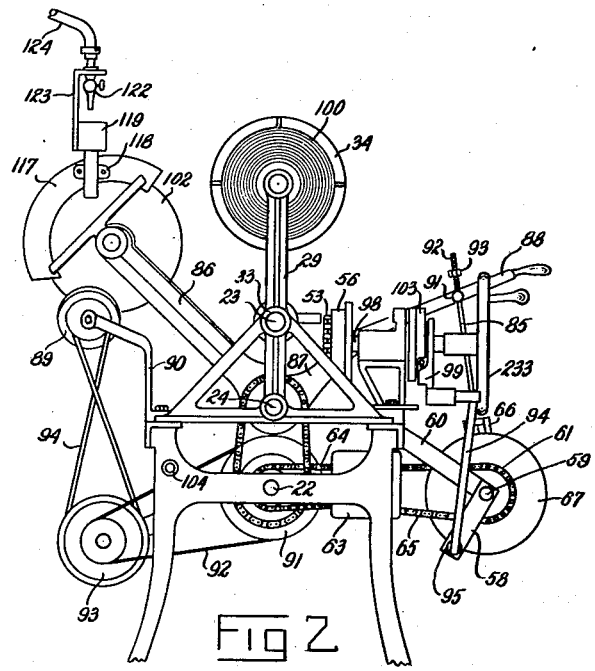
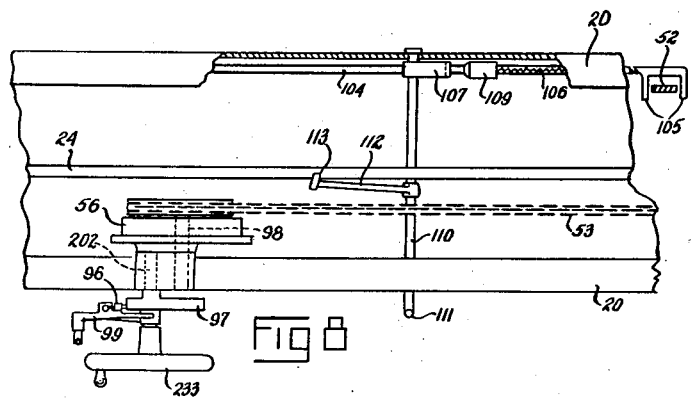
INVENTOR
Edward H. Groh
BY
ATTORNEY Jan. 9, 1940.  E. H. GROH  2,186,583
FABRIC CUTTING MACHINE
Filed July 21, 1938  3 Sheets-Sheet 3
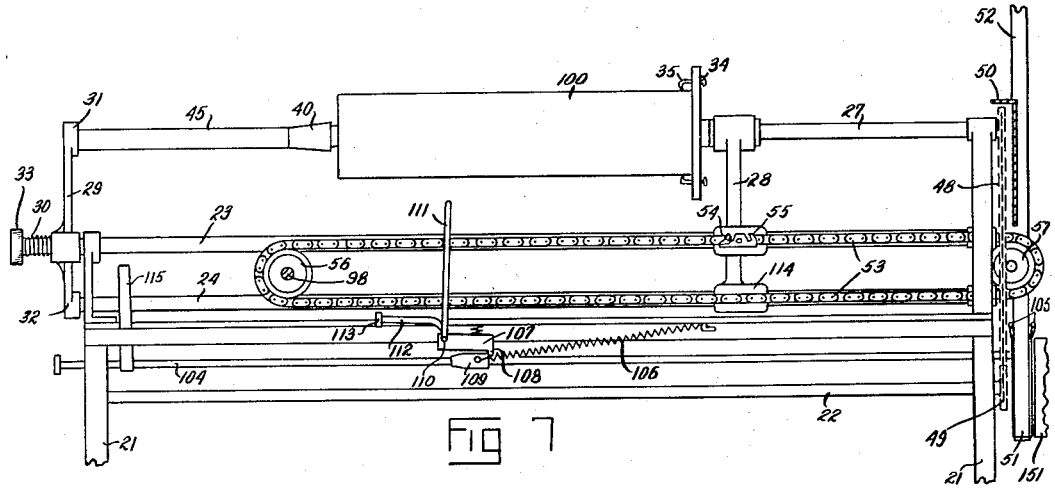
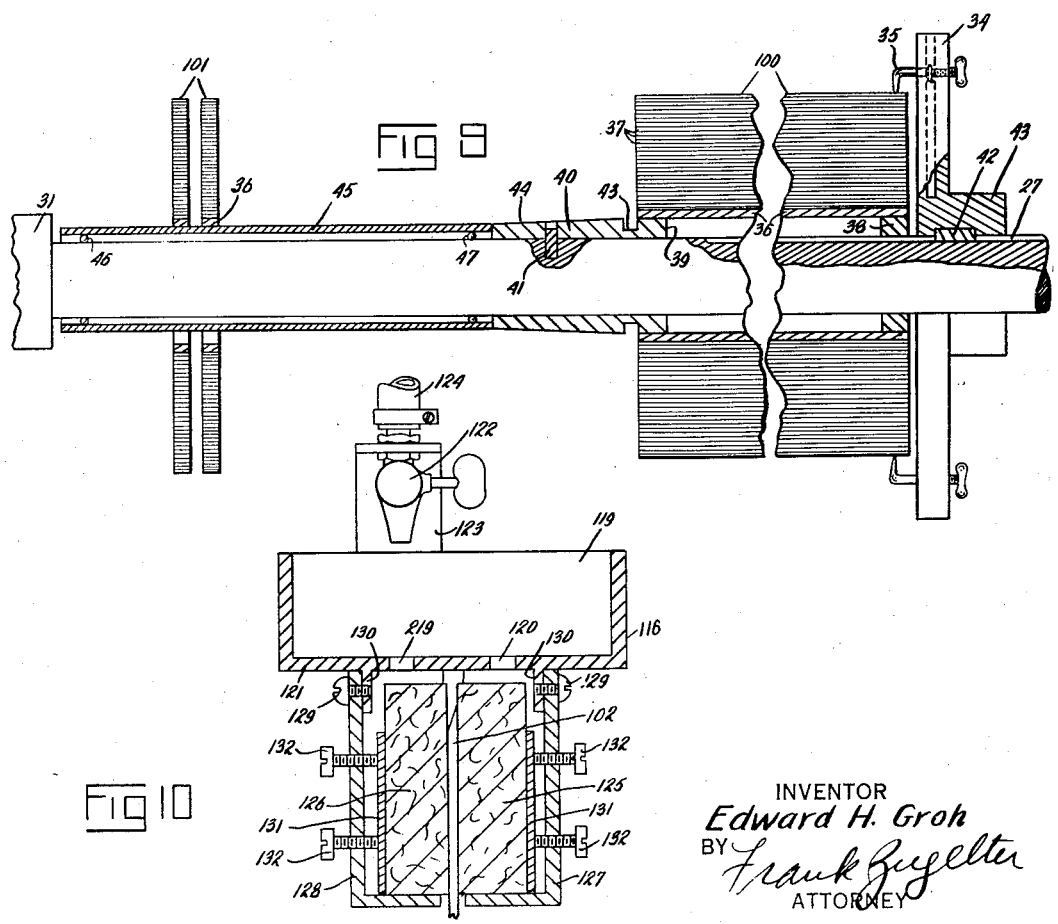
INVENTOR
Edward H. Groh
BY Frank Zugelter
ATTORNEY Patented Jan. 9, 1940

2,186,583

UNITED STATES PATENT OFFICE 2,186,583

FABRIC CUTTING MACHINE

Edward H. Groh, Cincinnati, Ohio, assignor to The O'Donnell Rubber Products Company, Cincinnati, Ohio, a corporation of Ohio Application July 21, 1938, Serial No. 220,475

8 Claims. (Cl. 164—69)

This invention relates to improvements in fabric cutting machines, and more particularly to a fabric cutting machine, the various operations of which are automatically controlled.

An object of this invention is to provide in a fabric cutting machine automatic means for severing uniform sections or narrow rolls from a wide master bolt or roll of fabric.

A further object of the invention is to provide an automatic cutting machine which cleanly severs individual sections or narrow rolls of fabric from a wide master roll.

Still a further object of the invention is to provide in an automatic cutting machine automatic machine stop means which are actuated when certain parts thereof assume a certain predetermined relationship.

Still a further object is to provide a fabric cutting machine having means associated therewith for preventing the unwinding of the severed sections.

These and other objects are attained by the means described herein, and disclosed in the accompanying drawings, in which:

Fig. 1 is a perspective view of a fabric cutting machine embodying the invention.

Fig. 2 is an end view of the machine shown in Fig. 1 certain non-essential parts being omitted for clarity of detail.

Fig. 3 is a plan view of a detail of the invention.

Fig. 4 is a fragmentary view of parts shown in Fig. 3.

Fig. 5 is an end view of a cam comprising a detail of the invention.

Fig. 6 is a view of disassembled parts comprising a detail of the invention disclosed in Fig. 4.

Fig. 7 is a fragmental view of the invention showing a detail thereof.

Fig. 8 is a fragmental top view of the detail shown in Fig. 7.

Fig. 9 is a sectional view of a detail of the invention.

Fig. 10 is a sectional view of a detail comprising the invention.

The machine comprising this invention will, solely for clarity of detail and by way of exemplification, be described as a machine for cutting narrow sections of fabric from a wide or master roll of fabric, and for purpose of example only, the word fabric as hereinafter used refers to adhesively coated fabric, such as reinforcing tape as used by the shoe manufacturers.

The reinforcing tape is fed through suitable guide members to the taping machines where such tape is applied to the shoe uppers, and since the taping machines are operated at a high rate of speed the reinforcing tape is pulled through the guide members at a rapid rate. In order that the reinforcing tape may freely pass through such guide members, it is essential that the width of the tape be uniform and constant. Likewise, it is highly desirable that the width of various individual narrow rolls of reinforcing tape be uniform in order that the taping machines may operate at maximum efficiency at all times. It is to provide automatic means for cutting uniform sections or narrow rolls from a wide master roll of fabric that this invention is primarily directed.

For clarity of understanding a brief description of how the machine comprising this invention operates will be given before the detailed description thereof.

A wide roll 100, hereafter referred to as the master roll of fabric from which narrow sections or rolls 101 are to be cut is rotatably mounted upon a driven shaft 27. A rotating knife 102 is advanced into said rotating master roll of fabric whereby a narrow roll as 101 is severed from the master roll. The knife is retracted after each cut away from the master roll. The narrow roll thus severed is transferred to the left by reason of the taper of a mandrel 40 being deposited upon a non-revolving shaft 45, where said severed or narrow rolls are maintained until a number of such rolls have accumulated as to warrant their removal, at which time they may all be removed at once. As the rotary knife is retracted away from the master roll after each cut, the entire master roll is moved a predetermined distance to the left whereby a new section of the master roll is presented for the rotating knife to sever upon its next forward cycle. Since the fabric comprising the master roll may be adhesively coated the rotating knife has a marked tendency to lose its cutting edge and also to become covered with particles of adhesive and cloth. A rotating grind wheel is provided rearward of the machine for grinding a new edge on said knife each time it is retracted away from the master roll after each cut. Likewise means are provided for continuously wiping the blade free of adhesive and cloth particles. In order to assure clean knife cuts any suitable lubricant is continually supplied to said blade. By reason of the rotating knife being sharpened at the end of each cut, said blade wears away rather quickly, with the result that the longer a blade is used its diameter becomes proportionally less so that the rotating knife must be advanced through a greater arc in order to completely sever a section from the master roll. Heretofore the cutting blade was manually advanced into and retracted from the master roll whereby the problem of advancing the blade through a greater arc to compensate for wear was very simply accomplished. Likewise, the step-by-step feed of the master roll into the cutting plane of the rotating knife was manually controlled with the result that it was impossible to obtain any number of sections or narrow rolls of fabric from a master roll, which were of the same width, due to the human errors which are ever present.

Applicant has provided automatic means for causing the rotating knife to be advanced into and retracted away from the master roll and for automatically advancing the master roll in an even equal step-by-step movement relative to said blade, and in order to prevent destruction of the rotating blade after substantially all of a master roll has been severed into narrow rolls, there are provided automatic stop means for stopping the machine until such time as the relationship of the parts is changed to a non-clashing or non-intercepting or non-destructive relationship.

As shown in Fig. 1, the machine comprises a structural framework including parallel, spaced angle irons 20 supported at either end upon suitable leg members 21 between which drive shaft 22 is rotatably mounted. Two fixed guide members 23 and 24 extend longitudinally of said framework being supported by suitable end brackets as 25 and 26. A driven shaft 27 is provided above and in the vertical plane of guide members 23 and 24 one end being supported by end bracket 26, the length intermediate its ends being supported by a moving carriage bracket member 28 which is free to slide longitudinally upon guide members 23 and 24, Figs. 1 and 7. The end of shaft 27 opposite bracket 26 is supported by a swivel bracket member 29 which may be moved to the left against the force of a spring 30 whereby bearing members 31 and 32 which normally engage the ends of shaft 27 and guide member 24 respectively, are caused to disengage said members, whereby bracket 29 may be swiveled about guide member 23 as a pivot. A suitable collar 33 secured to the end of guide member 23 provides a stop against which spring 30 acts and it also prevents bracket member 29 from being accidentally pulled off the end of said guide member. A face plate 34 is slidably keyed to driven shaft 27 in such a manner as to permit longitudinal movement relative to shaft 27 although keyed to rotate with said shaft, Fig. 9, by means of key 42 carried by boss 43.

As clearly shown in Fig. 9, the master roll comprises a hollow center core 36 of cardboard or other suitable material around which the adhesively coated fabric 37 is wound. Such a roll is positioned upon shaft 27 by swiveling bracket member 29 out of alignment with the end of said shaft whereby roll 100 can be slipped over the now open end of shaft 27. An annular collar 38 supports the end of the master roll adjacent face plate 34, the other end of said roll being supported by shoulder 39 of a tapered mandrel 40 which is secured to driven shaft 27 by any suitable means such as pin 41. Suitable holding means such as sharpened holding prongs 35 carried by face plate 34, are adapted to tightly grip the outer circumference of master roll 100 whereby said roll is caused to rotate with plate 34.

An annular groove 43 is provided circumferentially of mandrel 40, said groove being of such a depth as to accommodate the cutting edge of the rotating knife 102 after it passes through the cardboard core 36 of roll 100. The mandrel tapers off to the left of said groove whereby a narrow roll as 101 after being severed from master roll 100 will be carried to the left away from groove 43 by reason of the rotation and taper of said mandrel.

An idler shaft 45 is provided intermediate mandrel 40 and bearing member 31 of shaft 27, said shaft 45 being spaced from shaft 27 by means of suitable ball bearings as 46 and 47. The outside diameter of idler shaft 45 should not exceed the diameter of the tapered end of mandrel 40 whereby narrow severed rolls as 101 are free to slide upon said idler shaft 45 from mandrel 40. By reason of the ball bearing supports of shaft 45 said shaft will not rotate with driven shaft 27, with the advantageous result that the narrow severed rolls 101 are not rotatably maintained on idler shaft 45. This is highly desirable since a narrow severed roll, because of its inherent properties, tends to unwind itself even when caused to rotate at the same speed as the master roll from which it was cut.

Heretofore the narrow rolls after being severed from the master roll were permitted to rotate on and with driven shaft 27 with the result that they would unwind and become unfit for commercial use, however, by means of idler shaft 45 this difficulty has been efficiently and inexpensively overcome. When the length of shaft 45 is well filled with a plurality of narrow severed rolls, they may be removed by swiveling bracket 29 away from the end of shaft 27, as is done when mounting the master roll, whereby the idler shaft may be slipped off of shaft 27 and the narrow rolls thereon transferred in an orderly, stacked manner to the storage or shipping department.

By reference to Figs. 1 and 7, it will be seen that shaft 27 is driven by means of a chain 48 which is driven by sprocket 49 to drive shaft 22. A suitable guard as 50, may be disposed over said drive means as a safety measure. Drive shaft 22 is driven by any suitable means such as split pulley 51 which may be connected to any suitable source of power, not shown, by means of a belt as 52. It should be here noted that the master roll 100 is caused to rotate whenever the machine is in operation, since the connection between driven shaft 27 and drive shaft 22 is a direct one.

Face plate 34 and master roll 100 are propelled longitudinally of the device by means of movable carriage bracket 28 which in turn is caused to slide longitudinally of guide members 23 and 24 in response to the pull of chain 53, the opposite ends of which are anchored to said bracket as at 54 and 55 (Fig. 7). Chain 53 is supported at either end by suitable sprocket wheels 56 and 57, sprocket wheel 56 being the drive sprocket and sprocket 57 an idler.

The master roll is advanced to present a new section of material to the rotating knife after each narrow roll has been severed therefrom, said master roll being fixed against longitudinal movement during each cutting operation, whereby the master roll is advanced in a step-by-step manner relative to said rotating knife.

The action of the rotating knife 102 and step-by-step advancement of the master roll is accomplished in the following manner:

A driven crank shaft 59 rotatably mounted between suitable bracket members 60 is provided in spaced parallel relationship with the machine framework, as clearly shown in Figs. 1, 2 and 3. Bracket members 60 may be secured to frame member 20 by any suitable means such as by welding, or by means of bolts, not shown. A clutch is provided for controlling the operation of said crankshaft, said clutch comprising a driving sprocket wheel 61 and a driven member 62 which is keyed to crankshaft 59 and longitudinally slidable thereon whereby pins 262 may engage said driving sprocket 61. As shown in Fig. 3 the clutch is disengaged whereby sprocket wheel 61 is free to rotate relative to drive shaft 59 which is stationary.

By reference to Fig. 2, it is seen that power is transmitted from drive shaft 22 to gear reduction box 63 by means of chain 64 and from gear reduction box 63 to sprocket 61 by means of chain 65.

One end of crank shaft 59 terminates in crank arm 58, the other end terminating in a keyed fit with driven cam member 66 of the knife blade actuating mechanism. This mechanism comprises a cam 67 having a cam track 68 provided therein. It should be here noted that a portion, 69, of cam track 68 is flat, the reason for which will be later discussed. Cam 67 is non-rotatably secured to one bracket member 60 by any suitable means such as bolts, not shown. An aperture 70 is provided centrally of cam 67 to accommodate crankshaft 59 which is free to rotate therein. Driven cam member 66 may be secured to crankshaft 59 by any suitable means such as by means of a key 71. Member 66 comprises a boss 72, which terminates in two parallel spaced legs 73 and 74 each of which is vertically grooved as at 75. A cam follower 76 is carried by a U-shaped member 77 having spaced parallel legs 78 and 79. A tongue 80 is provided intermediate each leg adapted for sliding cooperation within grooves 75, of driven member 66.

An adjustable connecting link 81 also having a tongue 80 for cooperation with grooves 75, is positioned laterally between legs 78 and 79 of U-shaped member 77 by means of a threaded bolt 82 which engages complementary threads 83 of link 81. Threaded bolt 82 is adapted to be rotated in legs 78 and 79 but is of itself axially stationary therebetween. This is accomplished by any suitable means not shown. Rotation of bolt 82 causes connecting link 81 to be moved intermediate legs 78 and 79. A pin 84 is carried by said linkage member to which a connecting rod as 85 may be secured.

In operation crankshaft 59 causes driven cam member 66 to be rotated relative to stationary cam 67 whereby U-shaped member 77 is caused to oscillate within grooves 75 as cam follower 76 travels around cam groove 68. By regulating the position of link member 81 relative to arms 78 and 79 of said U-shaped member a greater or less amount of throw is imparted to connecting rod 85.

As shown in Fig. 2 rotating knife 102 is pivotally mounted relative to guide member 24 by means of support arm 86 which is operatively connected to actuating arm 87 which terminates in a knife control handle 88, so that by pulling downward on handle 88 rotating blade 102 describes an arc about guide member 24 as it advances toward master roll 100. Rotating blade 102 is directly driven from drive shaft 22 by suitable means such as a chain drive, not shown. As shown in Fig. 2, the rotating knife is in a retracted position, at which time blade 102 is caused to contact a continuously operating grinding or dressing wheel 89 which is suitably mounted to the structural framework of the machine by means of a bracket as 90. Dressing wheel 89 is directly driven from drive shaft 22 by means of pulley 91, belt 92, pulley 93 and belt 94 as clearly shown. The diameter of rotating knife 102 becomes less and less as the blade is used, due to the abrasive action of wheel 89, so that as the blade becomes smaller it is necessary to move knife control handle 88 through a greater arc in order to move blade 102 a distance sufficient to completely cut through the fabric comprising the master roll.

This adjustment is accomplished by means of bolt 82 which controls the relative position of linkage member 81, relative to U-shaped cam driven member 77. Connecting rod 85 is operatively connected to knife control handle 88 by means of pin 91 through which the upper threaded end 92 of connecting rod 85 extends. Relative adjustment is obtained between pin 91 and connecting rod 85 by means of adjustment nut 93.

When blade 102 is new the bolt 82 is turned so that linkage member 81 rests against inner leg 79 of U-shaped member 77. For any given position of nut 92 this setting gives a minimum throw whereby handle 88 is pulled downward through its smallest arc. Adjustment nut 92 is then positioned upon connecting rod 85 so that the cutting edge of blade 102 will enter but not touch the bottom of groove 43 of mandrel 40 (Fig. 9) when the cam is at the bottom of its downward throw. As knife 102 wears away the arc through which handle 88 is moved, is increased by adjusting bolt 82 whereby linkage member 81 is moved toward leg 78 of U-shaped member 77 whereby the effective stroke of the cam is increased with the result that the wear of blade 102 is compensated for. In this manner it is automatically possible to cause the rotating blade to be advanced into and retracted from the bolt of material to be severed, and to easily adjust the effective cam stroke to compensate for the wear of the knife blade.

The master roll 100 is advanced step-by-step into the plane of knife 102 by means of chain 53 as hereinbefore set forth. As shown in Figs. 2, 3, and 8, driven sprocket wheel 56 is controlled by ratchet 96 which cooperates with ratchet wheel 97 which is suitably geared to operate shaft 98 to which sprocket wheel 56 is secured by any suitable means such as by a key, not shown.

One end of reciprocating lever 99, which carries ratchet 96, is pivotally mounted to shaft 202 the other end being operatively associated with connecting rod 94 which translates the rotary motion of crank 58 through pin 95 to a reciprocating motion of lever 99. The number of degrees through which ratchet wheel 97 is turned each time lever 99 is moved downward, is controlled by means of adjustable cover plate 103 which may be selectively rotated relative to ratchet wheel 97 as to uncover more or less teeth to be engaged by ratchet 96.

It should be here noted that the throw of crank 58 is at least 180° behind the throw of cam 67 whereby carriage 28 will be advanced one step when the rotating blade 102 is in its retracted position. This relationship is important in order that the forward edge of the master roll of fabric will clear the cutting blade, the usefulness of which would be destroyed should the master roll be forced laterally against said blade.

In order to prevent face plate 34 from coming into the cutting plane of the rotating blade automatic machine stop means are provided. These means comprise a long belt shift control rod 104 (Figs. 7 and 8) which extends longitudinally of the machine structure, one end terminating in spaced parallel fingers 105 between which the drive belt 52 is disposed. By moving control rod 104 to the left drive belt 52 is caused to engage drive pulley 51, whereas movement to the right shifts belt 52 onto the idler pulley 151.

Control rod 104 is maintained to the left against the tension of spring 106 by means of a trip latch 107 which carries a downward extending lip 108 which engages the square edge of sleeve 109 which is secured relative to control shaft 104 by any suitable means, as a pin not shown. Trip latch 107 is secured to a trip lever shaft 110 which extends transversely of framework 20. One end of said shaft may be extended forward of the machine and turned upward to form a hand trip lever as 111. An auxiliary lever 112 is secured to shaft 110, by any suitable means, and extends upward and forward of shaft 110 as clearly shown in Fig. 7. An enlarged collar 113 is secured to the end of auxiliary lever 112 in such a manner as to be in line with and thereby easily forced downward by the lower front edge of lower guide bearing member 114 whereby trip lever shaft 110 is rotated counterclockwise thereby causing latch lip 108 to be raised and disengage sleeve 109. This permits spring 106 to pull control rod 104 to the right whereby the belt is shifted onto the idler pulley 151. Control rod 104 may be moved to the left to engage latch 107 with sleeve 109 by means of a suitable lever 115. In this manner the machine is completely stopped before the various parts thereof assume an intercepting and destructive relationship.

In order to maintain the rotating knife 102 in an efficient cutting condition, it is necessary that it be sharpened after each cut, as hereinabove set forth. It also becomes necessary to lubricate and wipe said blade during its rotation in order for it to cleanly cut through the master roll. Such lubrication and wiping action is accomplished by means of a housing 116 which is mounted to blade guard 117 by any suitable means such as bolts or set screws 118. As shown in Fig. 10, a lubricant trough 119 is provided having suitable discharge outlets as 219 and 120 located through bottom wall 121. A lubricant may be continuously and constantly supplied to said trough through valve 122 which is supported by a suitable bracket 123 which may be secured to one wall of the trough 119 by means of any suitable means such as a weld, not shown. Valve 122 is connected to a source of lubricant supply through a suitable flexible hose or pipe as 124. Lubricant passing through outlets 219 and 120 is absorbed by the felt or other suitable pads 125 and 126 which are disposed in contact with and on opposite sides of blade 102. Pads 125 and 126 are housed within removable containers 127 and 128 respectively, each being secured below trough 119 by any suitable means such as set screws 129 which engage trough-bottom depending lugs 130.

The pads are held against blade 102 by means of plates 131, which are positioned by means of set screws 132, as clearly disclosed in Fig. 10.

Lubricant absorbed by the felt pads 125 and 126 is deposited on knife 102 and any particles from dressing wheel 89 or from the roll of fabric being severed, are wiped from the blade by such moistened felt pads.

It is practically impossible to obtain speedy, clean cuts unless the rotating blade is constantly moistened and wiped, and both of these operations are effectively and efficiently simultaneously performed by the above described means.

From the foregoing it is apparent that I have produced an automatic fabric cutting machine, the rotary blade of which is automatically moistened and wiped during its entire cycle of being automatically advanced into a master roll of fabric and retracted therefrom, and I have likewise provided automatic means for advancing a master roll in a definite, accurate, predetermined step-by-step manner whereby the thickness of each narrow roll severed from the master roll is the same. Further I have provided automatic safety means for stopping the machine so that the rotating knife cannot operate at those times when to so operate would damage the machine.

It should be noted that a clutch 62 for controlling the operation of the rotating knife control lever 88 and ratchet step-by-step advance mechanism has been provided. The reason for this is to permit blade 102 to be sharpened for an indefinite period of time as contrasted from the short period of time provided when said blade is under the control of cam 67. Such indefinite sharpening periods are necessary each time a new blade is installed since a proper, exact and keen cutting edge must be provided before a roll of fabric can be neatly severed. Likewise in the event the blade should, for some unforseen reason, become too dull to be sufficiently sharpened while momentarily retracted under control of cam 67 further or prolonged sharpening may be accomplished by disengaging clutch 62.

In this respect it should be noted that adjustment nut 92 fixes the distance handle 88 is depressed by connecting rod 85, however, no abutment means is provided on connecting rod 85 below pin 91 for positively retracting knife 102. The weight of knife 102 is so distributed relative to guide member 24 about which it pivots that said knife is ever urged to move into its fully retracted position as shown in Fig. 2, therefore as crank shaft 85 is lifted by cam 67 the revolving blade 102 and associated mechanism are permitted to retract and come to rest upon a suitable stop member, not shown. When in a retracted position the facing wheel 89 is in operative alignment with said blade. By urging blade 102 only forward into cutting position it is free to momentarily pause in a retracted position as connecting rod 85 passes upwardly through the aperture in pin 91 and down again until adjustment nut 92 contacts pin 91, or as connecting rod 85 is moved through the uppermost portion of its cycle. In this way the sharpening period of blade 102 is greater than it would be were connecting rod relatively fixed to pin 91.

The stroke of connecting rod 85 need not be changed every time a new master roll is mounted, since groove 34 is of sufficient depth to accommodate the amount of blade which would normally be ground off of a blade after several master rolls have been severed into narrow rolls.

It should also be noted that a portion of cam track 68 has been flattened as at 69. This is done in order to decrease the rate of advance of knife 102 as it is advanced into the master roll of material on its cutting cycle, since said blade must be permitted to cut its way through roll 102 rather than forced through said roll, since to force the blade through a master roll of fabric produces uneven ridges in the severed section and it is also destructive to the blade. However, these disadvantages are effectively overcome by flattening track 68 as at 69. The reason for using this method of slowing down the rate of advance of said blade instead of slowing down the entire machine is to provide a means for slowly advancing the blade while maintaining a high R. P. M. of said blade necessary to properly cut through the fabric comprising the master roll which should also be rotated at a rapid R. P. M. for best results. Stated a different way, the cutting speeds must be maintained while the rate of advance of the cutting blade is retarded.

A handwheel 223 is provided on shaft 202 for operating ratchet wheel 97 manually in those instances when carriage member 28 is moved to the right as when a new master roll is mounted and for controlling bracket 28 at those times other than when said bracket member is being automatically propelled.

What is claimed is:

1. In a device of the class described the combination of a driven shaft for supporting and rotating a roll of material to be cut into narrow rolls, means for advancing a rotating knife into and away from said roll of material and means for advancing said roll of material a definite predetermined distance into the cutting plane of said knife after each narrow roll has been severed from said roll of material, and means disposed on said driven shaft for non-revolvably supporting the narrow severed rolls.

2. In a device of the class described the combination of a driven shaft for rotatably supporting a roll of material to be cut into narrow rolls, means for advancing a rotating knife into and away from said rolls, means for advancing said roll of material in an even predetermined step by step manner into the cutting plane of said knife after each cutting cycle thereof, and means for non-revolvably supporting the narrow severed rolls comprising a hollow sleeve spaced from and frictionlessly mounted relative to the driven shaft.

3. In a device of the class described the combination of a driven shaft for supporting and rotating a roll of material to be cut into narrow rolls, means for advancing a rotating knife into and away from said roll of material and means for advancing said roll of material a definite predetermined distance into the cutting plane of said knife after each narrow roll has been severed from said roll of material, means disposed on said driven shaft for non-revolvably supporting the narrow severed rolls, and means controlled by the relative position of the roll advancing means and the rotating knife for stopping the machine.

4. In combination with a tool, tool conditioning means comprising a lubricant trough disposed above said tool, a constant source of lubricant, a flexible hose extending from said source of lubricant and discharging in said trough, a pair of opposed containers disposed below said trough and in communication therewith, the adjacent sides of said containers being open, lubricant absorbent means disposed within each container, said absorbent means extending from the open side of each container for contacting said tool, means associated within said containers for maintaining said absorbent means in contact with said tool for cleaning and lubricating said tool.

5. In a device of the class described a work piece and a tool, means for advancing the work piece in a step by step manner toward said tool, said means comprising a driven shaft, a crank arm carried by said shaft, a clutch operated by said crank through a connecting rod, and driving means controlled by said clutch for advancing said work piece in one direction only, and means synchronized with said work piece advance mechanism for advancing said tool into the work comprising a second crank carried by said driven shaft and disposed relative to said first crank whereby its effective throw is synchronized relative to the throw of the first crank whereby the work is advanced subsequent to the retraction of said tool out of the plane of said work, and means for adjusting the effective throw of said second crank.

6. In a device of the class described comprising a mandrel means for supporting a work piece, means for advancing a tool into said work piece disposed upon said mandrel said advancing means comprising a driven shaft and a driven member secured to said driven shaft, a U-shaped member adapted to slidably engage said driven member, a cam, said cam being non-rotatably mounted relative to said driven shaft, a cam track follower carried by said U-shaped member, a linkage member disposed intermediate the legs of said U-shaped member, said linkage member being adjustable between said legs whereby the effective stroke of said cam may be varied for increasing the degree of advance of said tool into said work piece.

7. In a device of the class described the combination of a driven shaft, a mandrel carried by said driven shaft for rotatably supporting a roll of material to be cut into narrow rolls, means for advancing a rotating knife into and away from said roll, means for advancing said roll of material in an even predetermined step by step manner into the cutting plane of said knife after each cutting cycle thereof, means disposed on said driven shaft for non-revolvably supporting the narrow severed rolls, and means disposed intermediate the cutting plane of said knife and said severed roll supporting means for laterally shifting each narrow roll upon severance from said roll, onto said non-revolvable supporting means.

8. In a device of the class described the combination of a driven shaft including a mandrel for supporting and rotating a roll of material to be cut into narrow rolls, means for advancing a rotating knife into and away from said roll of material and means for advancing said roll of material a definite predetermined distance into the cutting plane of said knife after each narrow roll has been severed from said roll of material, means disposed on said driven shaft for non-revolvably supporting the narrow severed rolls, the diameter of said non-revolvable shaft being less than the diameter of the roll supporting mandrel adjacent the cutting plane of said knife, that portion of said mandrel intermediate said non-revolvable shaft and the cutting plane of said knife being tapered off to said non-revolvable shaft for laterally shifting each severed roll from said rotating mandrel onto said non-revolvable shaft.

EDWARD H. GROH.